(12) United States Patent
Kim et al.

(10) Patent No.: US 8,855,033 B2
(45) Date of Patent: Oct. 7, 2014

(54) APPARATUS AND METHOD FOR REDUCING POWER CONSUMPTION USING PACKET FILTERING IN PORTABLE TERMINAL

(75) Inventors: Jin-Yup Kim, Yongin-si (KR); Chang-Soon Kim, Suwon-si (KR); Jong-Mu Choi, Gunpo-si (KR); Jun-Hwan An, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 335 days.

(21) Appl. No.: 13/014,880

(22) Filed: Jan. 27, 2011

(65) Prior Publication Data

US 2011/0194474 A1 Aug. 11, 2011

(51) Int. Cl.
*G08C 17/00* (2006.01)
(52) U.S. Cl.
USPC ............................................... 370/311

(58) Field of Classification Search
USPC .......................................... 370/311
See application file for complete search history.

(56) References Cited

U.S. PATENT DOCUMENTS

| | | | |
|---|---|---|---|
| 2003/0179725 A1 | 9/2003 | Lo et al. | |
| 2007/0211725 A1* | 9/2007 | Kawata et al. | 370/392 |
| 2007/0254619 A1* | 11/2007 | Salomone et al. | 455/343.2 |
| 2008/0267214 A1* | 10/2008 | Jaakkola | 370/468 |
| 2009/0232039 A1* | 9/2009 | Jung | 370/311 |
| 2010/0008234 A1 | 1/2010 | Ulupinar et al. | |

* cited by examiner

*Primary Examiner* — Sulaiman Nooristany
(74) *Attorney, Agent, or Firm* — Jefferson IP Law, LLP

(57) ABSTRACT

An apparatus and a method for reducing power consumption using packet filtering in a portable terminal are provided to allow a modem to filter a packet in order to prevent an Application Processor (AP) from waking up from a sleep mode due to an unnecessary packet. The portable terminal includes an AP for providing a list of packets required in the AP itself to a packet determiner, and the packet determiner for filtering a packet included in the list provided from the AP and for providing the packet included in the list to the AP.

14 Claims, 4 Drawing Sheets

US 8,855,033 B2

APPARATUS AND METHOD FOR REDUCING POWER CONSUMPTION USING PACKET FILTERING IN PORTABLE TERMINAL

PRIORITY

This application claims the benefit under 35 U.S.C. §119(a) of a Korean patent application filed in the Korean Intellectual Property Office on Feb. 8, 2010 and assigned Serial No. 10-2010-0011410, the entire disclosure of which is hereby incorporated by reference.

BACKGROUND OF THE INVENTION

1. Field of the Invention

The present invention relates to an apparatus and a method for reducing power consumption in a portable terminal. More particularly, the present invention relates to an apparatus and a method for reducing power consumption using packet filtering in the portable terminal. That is, the present invention allows a modem to filter a packet in order to prevent an Application Processor (AP) from waking up from a sleep mode due to an unnecessary packet.

2. Description of the Related Art

Portable terminals have become necessities of modern life for people of all ages. Thus, service providers and terminal manufacturers are competitively developing various products and services.

For example, a portable terminal has developed into a multimedia device capable of providing various services, such as a phonebook, a game, a Short Message Service (SMS), an Electronic (E)-mail, a morning call, a Motion Picture Expert Group (MPEG)-1 or MPEG-2 Audio Layer-3 (MP3) player, scheduling, a digital camera, a Multimedia Message Service (MMS), a wireless Internet, and the like.

Although the development of batteries is negligible in comparison with the rapid development of portable terminals, a required battery size is decreased due to portability of portable terminals, which results in the limitation of battery capacity.

In order to support more functions of the portable terminal with the limited battery capacity, power consumption of the portable terminal has to be reduced in addition to the increase of the battery capacity.

Therefore, in a case where the portable terminal may not operate for a specific time period due to the limited battery use, there is a need to increase a usage time by allowing the portable terminal to enter a sleep mode.

The sleep mode is a mode for switching a hardware module of the portable terminal to a sleep state. The hardware module wakes up from the sleep mode upon receiving a packet.

However, if the portable terminal wakes up upon receiving an unnecessary packet, the portable terminal unnecessarily wakes up from the sleep mode. This implies that unnecessary power consumption occurs due to the unnecessary wakeup.

The portable terminal does not filter a received packet, and thus provides an unnecessary packet to an Application Processor (AP). The AP wakes up to determine necessity of the received packet.

Since the AP directly wakes up to determine necessity of the received packet instead of performing packet filtering on the unnecessary packet, unnecessary power consumption occurs.

Accordingly, there is a need for an apparatus and a method for filtering a packet required in the AP to reduce power consumption of a portable terminal caused by the unnecessary wakeup.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for reducing power consumption using packet filtering in a portable terminal.

Another aspect of the present invention is to provide an apparatus and a method for allowing a modem to filter a packet by making a list of packets required in an Application Processor (AP) in order to reduce power consumption of a portable terminal.

Still another aspect of the present invention is to provide an apparatus and a method for allowing a modem to filter a packet in order to prevent an AP from waking up from a sleep mode due to an unnecessary packet.

In accordance with an aspect of the present invention, a portable terminal for reducing power consumption using packet filtering is provided. The terminal includes an AP for providing a list of packets required in the AP itself to a packet determiner, and the packet determiner for filtering a packet included in the list provided from the AP and for providing the packet included in the list to the AP.

In accordance with another aspect of the present invention, a method of reducing power consumption using packet filtering in a portable terminal is provided. The method includes a packet filtering process of an AP for providing a list of packets required in the AP itself to a packet determiner, and a packet filtering process of the packet determiner for filtering a packet included in the list provided from the AP and for providing the packet included in the list to the AP.

In accordance with another aspect of the present invention, a portable terminal for reducing power consumption using packet filtering is provided. The terminal includes a modem for receiving a packet, a memory unit for storing a list of packets required in an AP, a packet determiner for filtering a packet included in the list of packets and for providing the packet included in the list to the AP, and the AP which wakes up from a sleep mode upon receiving a packet from the packet determiner, wherein the AP provides the list of packets to the packet determiner when entering the sleep mode.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

DETAILED DESCRIPTION OF EXEMPLARY EMBODIMENTS

Figure 1:
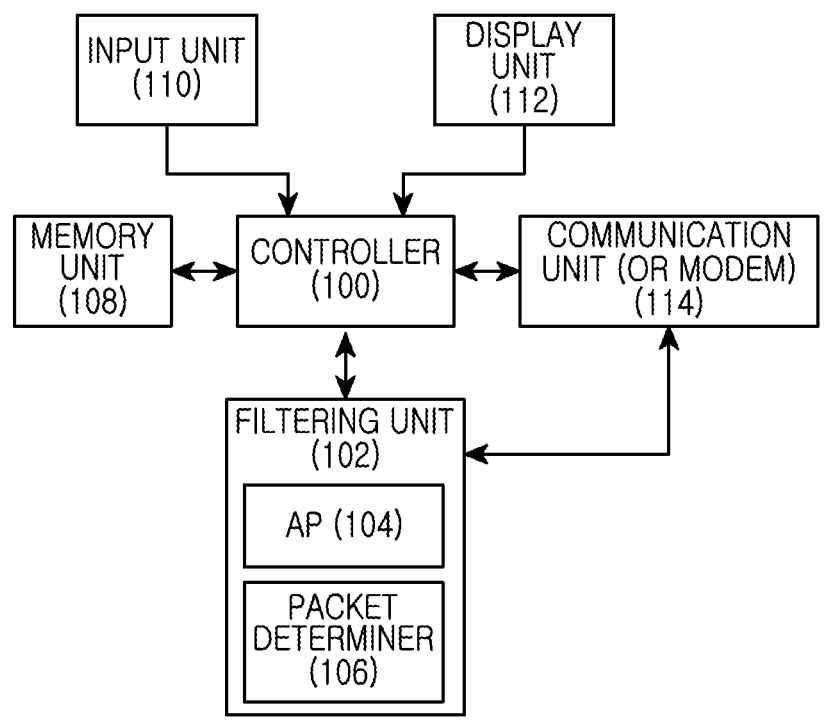
FIG. 1 is a block diagram illustrating a structure of a portable terminal for reducing power consumption using a packet filtering process according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of present invention described below relate to an apparatus and a method for allowing a modem to provide a packet required in an Application Processor (AP) by filtering the packet in order to prevent the AP from waking up from a sleep mode due to an unnecessary packet in a portable terminal.

FIGS. 1 through 4, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly state otherwise. A set is defined as a non-empty set including at least one element.

FIG. 1 is a block diagram illustrating a structure of a portable terminal for reducing power consumption using a packet filtering process according to an exemplary embodiment of the present invention.

Referring to FIG. 1, a portable terminal includes a controller 100, a filtering unit 102, a memory unit 108, an input unit 110, a display unit 112, and a communication unit (also referred to as a modem) 114. The filtering unit 102 includes an AP 104 and a packet determiner 106. The portable terminal may include additional units that are not illustrated merely for the sake of clarity. Similarly, the functionality of two or more of the above units may be integrated into a single component.

The controller 100 of the portable terminal provides overall control to the portable terminal. For example, the controller 100 processes and controls voice telephony and data communication, and in addition allows the filtering unit 102 to filter a received packet in order to solve a power consumption problem caused by an unnecessary packet among packets received by the communication unit (or modem) 114.

That is, the controller 100 determines whether the packet received through the communication unit (or modem) 114 is required in the AP 104, and discards the packet if it is not required in the packet determiner 106.

Under the control of the controller 100, the filtering unit 102 filters the packet received through the communication unit (or modem) 114, and provides the filtered packet required in the AP 104 to the AP 104.

In this case, the filtering unit 102 prevents the AP 104 from waking up from a sleep mode due to the unnecessary packet after the AP 104 enters the sleep mode. The packet filtering can reduce power consumption of the portable terminal.

The AP 104 of the filtering unit 102 controls an application operation of the portable terminal, and processes the packet provided from the communication unit (or modem) 114.

The AP 104 enters the sleep mode for power consumption when there is no operation for a specific period of time. Upon receiving the packet from the communication unit (or modem) 114 during the sleep mode, the AP 104 wakes up to process the received packet.

However, the AP 104 performs filtering by using a packet filtering list so as to be prevented from waking up due to the unnecessary packet. The packet filtering list is a list of information of packets required in the AP 104.

Thereafter, the AP 104 provides the list to the packet determiner 106 at a time of entering the sleep mode and thus allows the packet determiner 106 to filter a packet included in the list.

Accordingly, the AP 104 wakes up from the sleep mode upon receiving a packet filtered by the packet determiner 106 (i.e., a packet required in the AP 104 and included in the packet filtering list).

The packet determiner 106 of the filtering unit 102 is allowed to filter the packet required in the AP 104 which has entered the sleep mode under the control of the filtering unit 102.

That is, the packet determiner 106 is an entity for filtering a packet received from the communication unit (or modem) 114. The packet determiner 106 may be included in the communication unit (or modem) 114 and may be independent from the AP 104.

The packet determiner 106 is located between the AP 104 and the communication unit (or modem) 114. After determining whether a packet received from the communication unit (or modem) 114 is included in the packet filtering list received from the AP 104, the packet determiner 106 provides a packet included in the packet filtering list to the AP 104, and discards a packet not included in the packet filtering list.

The memory unit 108 includes a Read Only Memory (ROM), a Random Access Memory (RAM), a flash ROM, and the like. The ROM stores a microcode of a program, by which the controller 100 and the filtering unit 102 are processed and controlled, and a variety of reference data.

The RAM is a working memory of the controller 100 and stores temporary data that is generated while programs are performed. The flash ROM stores a variety of rewritable data, such as phonebook entries, outgoing messages, incoming messages, and the like. In addition, according to an exemplary embodiment of the present invention, the memory unit 108 stores the packet filtering list which is a list of information of packets required in the AP 104.

The input unit 110 includes a plurality of function keys, such as numeral key buttons '0' to '9', a menu button, a cancel button, an OK button, a talk button, an end button, an Internet access button, a navigation key button, a character input key, and the like. The input unit 110 provides key input data corresponding to a key pressed by a user to the controller 100.

The display unit 112 displays information, such as state information, which is generated while the portable terminal operates limited numeric characters, large volumes of moving and still pictures, and the like. The display unit 112 may be a color Liquid Crystal Display (LCD), an Active Mode Organic Light Emitting Diode (AMOLED), and the like. The display unit 112 may include a touch input device as an input device when using a touch input type portable terminal.

The communication unit 114 transmits and receives a Radio Frequency (RF) signal of data that is input and output through an antenna (not illustrated). For example, in a transmitting process, data to be transmitted is subject to a channel-coding process and a spreading process, and then the data is transformed to an RF signal. In a receiving process, the RF signal is received and transformed to a base-band signal, and the base-band signal is subject to a de-spreading process and a channel-decoding process, thereby restoring the data. According to an exemplary embodiment of the present invention, the communication unit 114 implies a modem supporting a Wireless Local Area Network (WLAN) environment and a modem supporting a Universal Mobile Telecommunication System (UMTS) environment, and transmits and receives data for each modem. Therefore, it can be interpreted that functions of the modems are integrated in the communication unit 114.

Although a function of the filtering unit 102 can be performed by the controller 100, they are herein separately constructed for exemplary purposes only. Thus, those of ordinary skill in the art can understand that various modifications can be made within the scope of the present invention. For example, functions of the filtering unit 102 and the controller 100 can be both processed by the controller 100.

Figure 2:
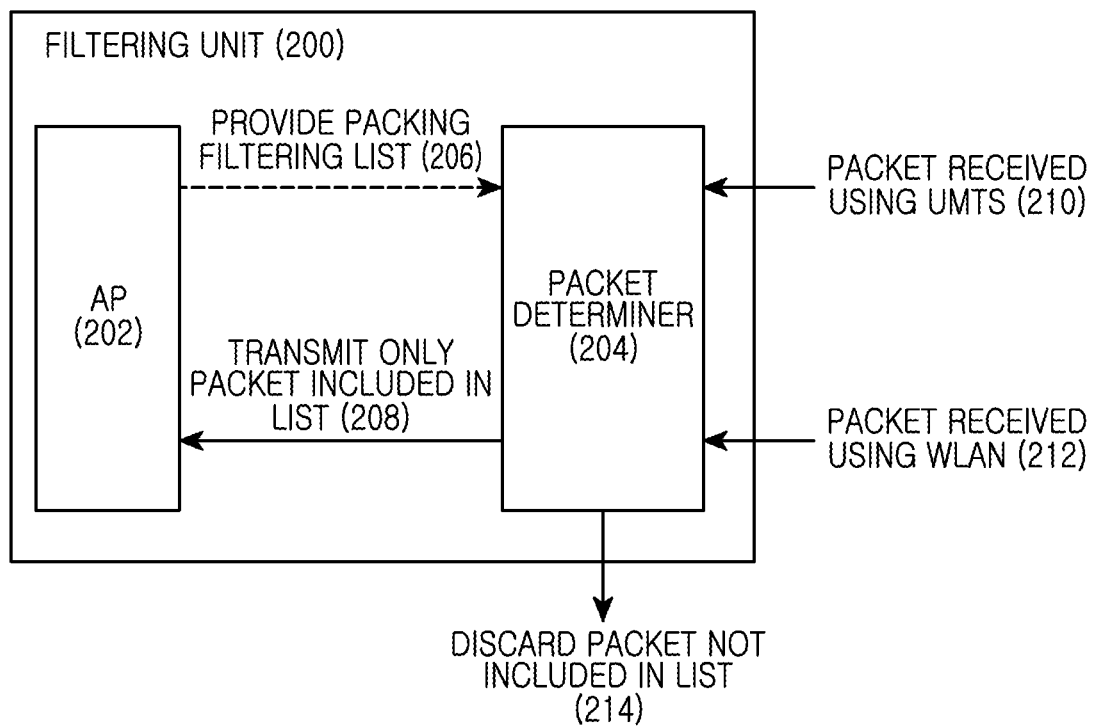
FIG. 2 illustrates a packet filtering process of a filtering unit according to an exemplary embodiment of the present invention.

FIG. 2 illustrates a packet filtering process of a filtering unit according to an exemplary embodiment of the present invention.

Referring to FIG. 2, a filtering unit 200 includes an AP 202 and a packet determiner 204, similarly to the above description.

First, the AP 202 makes a list of packets required in the AP 202 and thereafter provides the list (i.e., a packet filtering list) to the packet determiner 204 at a time of entering a sleep mode in step 206.

The packet determiner 204 performs a filtering process on the packet by discarding a packet not existing in the packet filtering list among received packets.

For example, under the assumption that the packet determiner 204 receives packets from a modem supporting a UMTS environment and a modem supporting a WLAN, the packet determiner 204 performs packet filtering on a broadcast address, a multicast address, a destination address, a port, and a protocol and thus determines whether packets 210 and 212 received from the modems are included in the list received from the AP 202.

That is, in step 208, the packet determiner 204 provides a packet included in the packet filtering list to the AP 202, and discards a packet not included in the packet filtering list in step 214. In this case, upon receiving the packet not included in the packet filtering list from the modem supporting the UMTS environment, the packet determiner 204 may release a Radio Resource Control (RRC) connection after receiving the packet.

Accordingly, the AP 202 receives a packet filtered by the packet determiner 204, and thus does not receive an unnecessary packet. It implies that the AP 202 can be prevented from waking up from the sleep mode because the unnecessary packet is received from the packet determiner 204 after the AP 202 enters the sleep mode.

Figure 3:
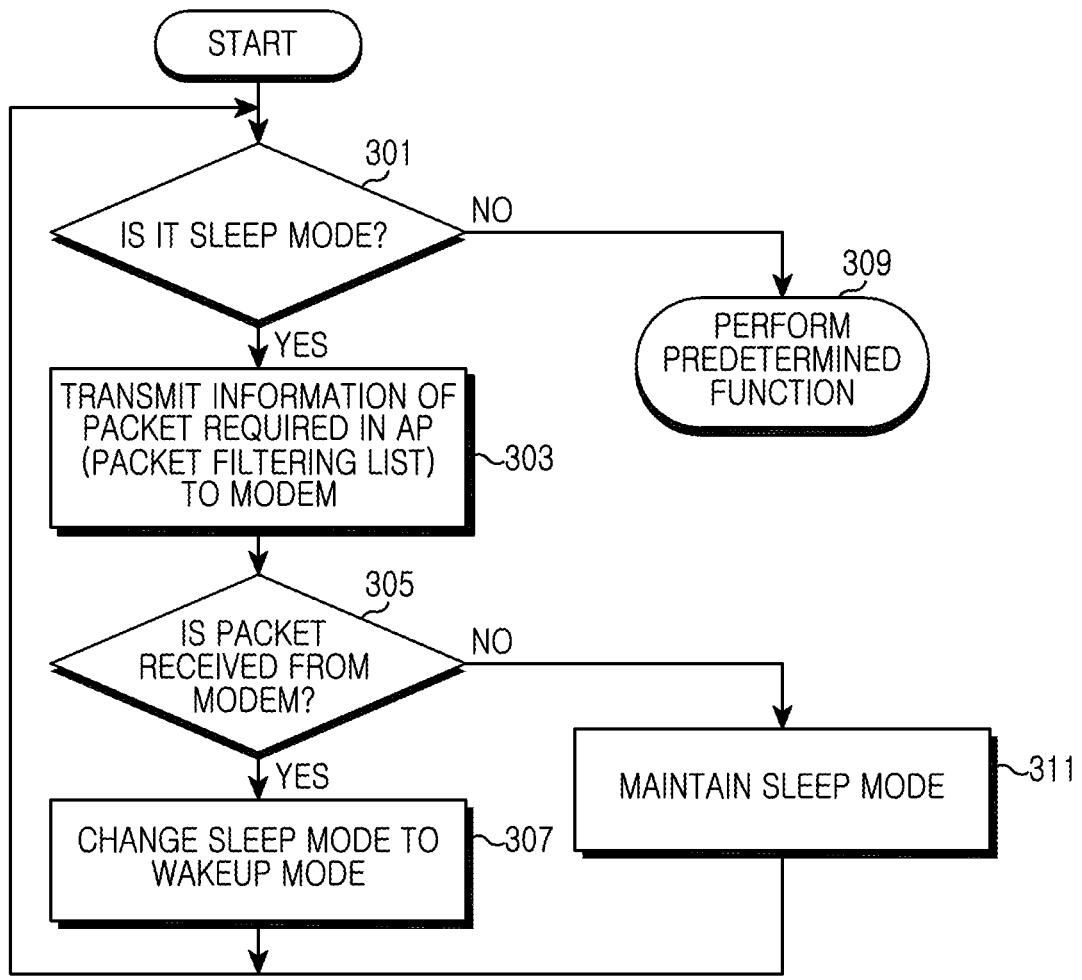
FIG. 3 is a flowchart illustrating a packet filtering process of an Application Processor (AP) according to an exemplary embodiment of the present invention.

FIG. 3 is a flowchart illustrating a packet filtering process of an AP according to an exemplary embodiment of the present invention.

Referring to FIG. 3, an AP 104 determines whether the portable terminal enters a sleep mode in step 301.

Herein, in order to avoid battery consumption caused by frequent wakeup due to an unnecessary packet in a state where the portable terminal has entered the sleep mode, the AP 104 uses a time of providing information on a packet required in the AP 104 as a time at which the portable terminal enters the sleep mode.

If it is determined in step 301 that the portable terminal does not enter the sleep mode, proceeding to step 309, the AP 104 performs a predefined function (e.g., processing of a packet received in a wakeup mode).

In contrast, if it is determined in step 301 that the portable terminal enters the sleep mode, proceeding to step 303, the AP 104 provides the modem (i.e., the communication unit of FIG. 1) with the information of the packet required in the AP 104.

That is, the AP 104 transmits to the modem the packet filtering list which is a list of packets required in the AP 104 when entering the sleep mode, so as to allow the modem to filter a packet included in the packet filtering list. In this manner, the AP 104 does not have to wake up when an unnecessary packet is received.

In step 305, the AP 104 determines whether a packet is received from the modem. Herein, the packet provided from the modem becomes a packet required in the AP and filtered in the packet filtering process.

If it is determined in step 305 that the packet is not received from the modem, proceeding to step 311, the AP 104 maintains the sleep mode of step 301.

In contrast, if it is determined in step 305 that the packet is received from the modem, proceeding to step 307, the AP 104 changes an operation mode of the portable terminal to a wakeup mode to wake up from the sleep mode.

Thereafter, the AP 104 repeats the aforementioned operations.

Figure 4:
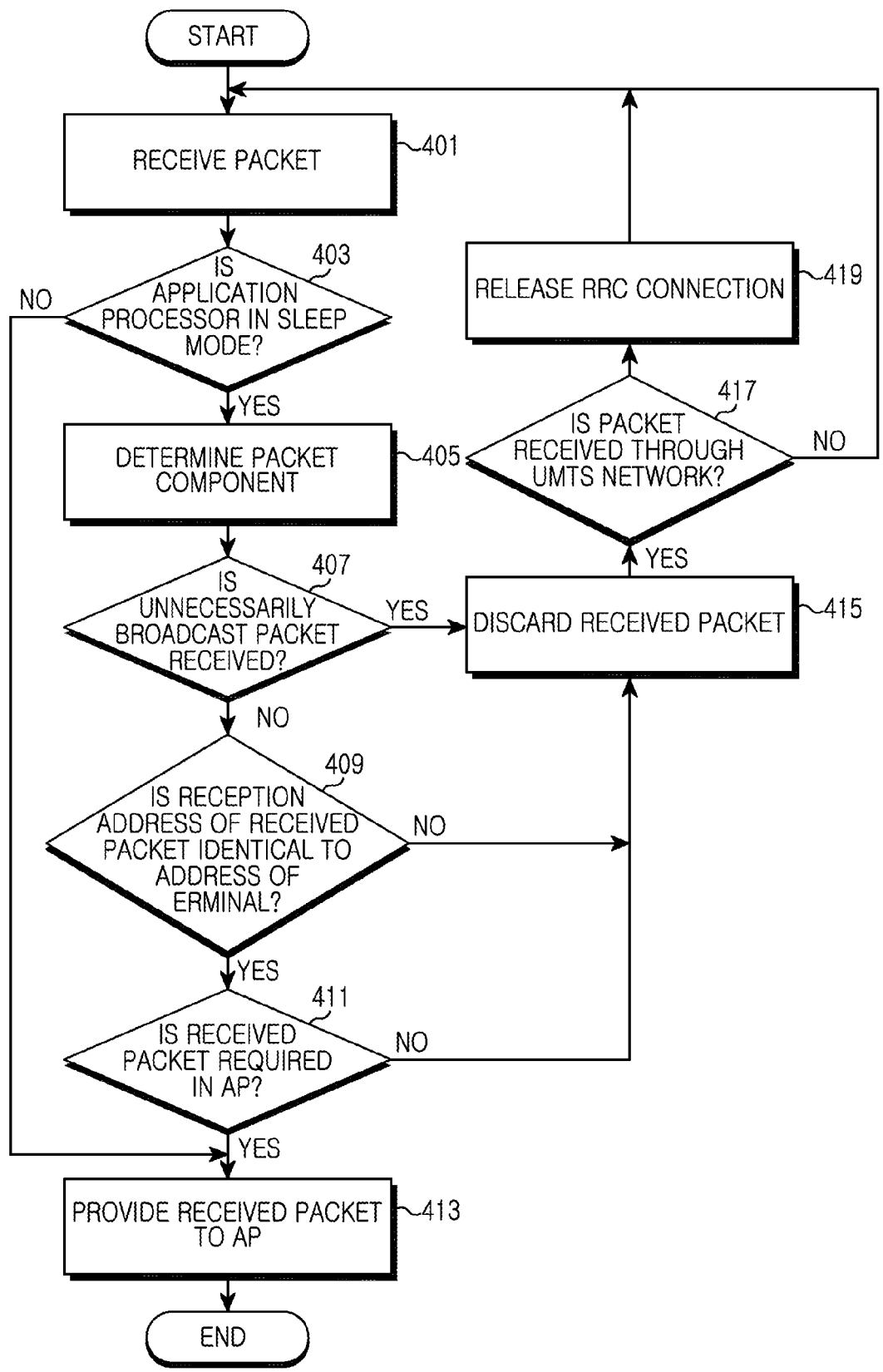
FIG. 4 is a flowchart illustrating a packet filtering process of a modem according to an exemplary embodiment of the present invention.

FIG. 4 is a flowchart illustrating a packet filtering process of a modem according to an exemplary embodiment of the present invention.

Referring to FIG. 4, a modem is a communication unit for receiving a packet. It is assumed that the modem can perform operations in WLAN and UMTS environments.

In order to perform the packet filtering process, the modem receives a transmitted packet in step 401, and determines whether the AP 104 enters a sleep mode in step 403.

If it is determined in step 403 that the AP 104 remains in a wakeup mode instead of remaining in the sleep mode, proceeding to step 413, the modem provides the received packet to the AP 104 which remains in the wakeup mode.

In contrast, if it is determined in step 403 that the AP 104 remains in the sleep mode, proceeding to step 405, the modem determines a component of the received packet. Herein, the operation of step 405 is performed to determine whether the received packet is required in the AP 104. A packet to be multicast or broadcast may not be required in the AP.

In step 407, the modem determines a result of packet component determination of step 405.

If an unnecessary packet such as a broadcast packet, a multicast packet, etc., is received in step 407, proceeding to step 415, the modem discards the received packet. That is, the modem prevents the unnecessary packet from being provided to the AP 104 so that the AP 104 does not wake up from the sleep mode.

After discarding the unnecessary packet, proceeding to step 417, the AP 104 determines whether the unnecessary packet is received in the UMTS environment.

If it is determined in step 417 that the received unnecessary packet is not received in the UMTS environment (i.e., if the packet is received in the WLAN environment), the modem repeats the operation of step 401.

In contrast, if it is determined in step 417 that the received unnecessary packet is received in the UMTS environment, proceeding to step 419, the modem releases an RRC connection, and then re-performs the operation of step 401.

If it is determined in step 407 that the received packet is not the unnecessary packet, such as the broadcast packet, the multicast packet, etc., proceeding to step 409, the modem determines whether a reception address of the received packet is identical to an address of the portable terminal itself.

If it is determined in step 409 that the reception address of the received packet is different from the address of the portable terminal, proceeding to step 415, the modem discards the received packet.

In contrast, if it is determined in step 409 that the reception address of the received packet is identical to the address of the mobile terminal, that is, if it is determined that the packet is transmitted for the mobile terminal, proceeding to step 411, the modem determines whether the received packet is required in the AP 104.

In this case, the modem may perform the operation of step 411 by determining whether the received packet is included in a packet filtering list, i.e., information of packet required in the AP 104 and provided at a time when the AP 104 enters the sleep mode.

If it is determined in step 411 that the received packet is not required in the AP 104, that is, the received packet is not included in the packet filtering list provided by the AP 104, then proceeding to step 415, the modem discards the received packet.

In contrast, if it is determined in step 411 that the received packet is required in the AP 104, that is, the received packet is included in the packet filtering list provided by the AP 104, proceeding to step 413, the modem provides the received packet to the AP 104.

That is, the modem can determine a packet desired by the AP 104 by using information of the packet provided from the AP 104, thereby filtering a packet included in the packet information.

Since an unnecessary packet is discarded by the modem, the AP 104 in the sleep mode can be avoided from frequently waking up due to the received packet. As a result, there is an advantage in that power consumption of the portable terminal can be reduced.

Thereafter, the procedure of FIG. 4 ends.

According to an exemplary embodiment of the present invention, an apparatus and a method for reducing power consumption by filtering a packet in a modem of a portable terminal are provided. A packet required in an AP is directly filtered in the modem, thereby preventing an unnecessary packet from being provided to the AP. Therefore, power consumption can be reduced by preventing the AP from unnecessarily waking up from a sleep mode.

While the invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A portable terminal for reducing power consumption using packet filtering, the terminal comprising:
   an Application Processor (AP) for providing a packet filtering list including a list of packets required in the AP itself to a packet determiner; and
   the packet determiner for filtering a packet based on the packet filtering list and for providing only packets included in the packet filtering list to the AP,
   wherein the AP provides the packet filtering list when entering a sleep mode, maintains the sleep mode until a packet is received from the packet determiner, and wakes up from the sleep mode when the packet is received from the packet determiner;
   wherein after receiving the packet filtering list from the AP, the packet determiner performs a filtering process for determining a component of a packet received from a modem and then for determining whether the received packet is included in the received packet filtering list.

2. The terminal of claim 1, wherein the packet received from the packet determiner is required in the AP.

3. The terminal of claim 1, wherein if it is determined in the filtering process that the received packet is included in the packet filtering list, the packet determiner provides the packet to the AP, and if it is determined in the filtering process that the received packet is not included in the packet filtering list, discards the received packet.

4. The terminal of claim 3, wherein upon receiving the packet not included in the packet filtering list through a modem supporting a Universal Mobile Telecommunication System (UMTS) environment, the packet determiner discards the received packet and thereafter releases a Radio Resource Control (RRC) connection.

5. The terminal of claim 4, wherein the packet determiner performs the packet filtering process on at least one of a broadcast address, a multicast address, a destination address, a port, and a protocol.

6. A method of reducing power consumption using packet filtering in a portable terminal, the method comprising:
   a packet filtering process of an Application Processor (AP) for providing a packet filtering list including a list of packets required in the AP itself to a packet determiner; and
   a packet filtering process of the packet determiner for filtering a packet based on the packet filtering list and for providing only packets included in the packet filtering list to the AP,
   wherein the packet filtering process of the AP comprises:
   providing the packet filtering list when entering a sleep mode;
   maintaining the sleep mode until a packet is received from the packet determiner; and
   waking up from the sleep mode when the packet is received from the packet determiner;
   wherein the packet filtering process of the packet determiner comprises:
   receiving the packet filtering list from the AP;
   determining a component of a packet received from a modem; and determining whether the received packet is included in the received packet filtering list.

7. The method of claim 6, wherein the packet received from the packet determiner is required in the AP.

8. The method of claim 6, wherein the packet filtering process of the packet determiner comprises:
   providing the packet to the AP if it is determined in the filtering process that the received packet is included in the packet filtering list; and
   discarding the received packet if it is determined in the filtering process that the received packet is not included in the packet filtering list.

9. The method of claim 8, wherein the packet filtering process of the packet determiner further comprises, upon receiving the packet not included in the packet filtering list through a modem supporting a Universal Mobile Telecommunication System (UMTS) environment, discarding a received packet and thereafter releasing a Radio Resource Control (RRC) connection.

10. The method of claim 9, wherein the packet determiner performs the packet filtering process on at least one of a broadcast address, a multicast address, a destination address, a port, and a protocol.

11. A portable terminal for reducing power consumption using packet filtering, the terminal comprising:
   a modem for receiving a packet;
   a memory unit for storing a packet filtering list including a list of packets required in an Application Processor (AP);
   a packet determiner for filtering a packet included in the packet filtering list and for providing the packet included in the packet filtering list to the AP; and
   the AP which wakes up from a sleep mode upon receiving a packet from the packet determiner, wherein the AP provides the packet filtering list to the packet determiner when entering the sleep mode;
   wherein after receiving the packet filtering list from the AP, the packet determiner performs a filtering process for determining a component of a packet received from a modem and then for determining whether the received packet is included in the received packet filtering list.

12. The terminal of claim 11, wherein if it is determined in the filtering process that the received packet is included in the packet filtering list, the packet determiner provides the packet to the AP, and if it is determined in the filtering process that the received packet is not included in the packet filtering list, discards the received packet.

13. The terminal of claim 11, wherein upon receiving the packet not included in the packet filtering list through a modem supporting a Universal Mobile Telecommunication System (UMTS) environment, the packet determiner discards the received packet and thereafter releases a Radio Resource Control (RRC) connection.

14. The terminal of claim 13, wherein the packet determiner performs the packet filtering process on at least one of a broadcast address, a multicast address, a destination address, a port, and a protocol.

\* \* \* \* \*